US008940345B1

(12) United States Patent
    Garwood

(10) Patent No.: US 8,940,345 B1
(45) Date of Patent: Jan. 27, 2015

(54) ANTIMICROBIAL ULTRAVIOLET DEVICE

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 441 days.

(21) Appl. No.: 13/024,965

(22) Filed: Feb. 10, 2011

Related U.S. Application Data

(60) Provisional application No. 61/303,185, filed on Feb. 10, 2010.

(51) Int. Cl.
    *A23L 3/22* (2006.01)
    *A23L 3/28* (2006.01)
(52) U.S. Cl.
    USPC ............................ 426/237; 426/246; 426/248
(58) Field of Classification Search
    CPC .................................... A23L 1/00; A23L 2/00
    USPC ........................... 426/237, 240, 248, 326, 392
    See application file for complete search history.

(56) References Cited

U.S. PATENT DOCUMENTS

| 4,983,411 | A | 1/1991 | Tanaka et al. |
| 2005/0260311 | A1 | 11/2005 | Garwood |
| 2007/0254074 | A1* | 11/2007 | Garwood ..................... 426/326 |
| 2009/0311392 | A1 | 12/2009 | Newman |

FOREIGN PATENT DOCUMENTS

EP          1 501 366 B1    2/2005

OTHER PUBLICATIONS

International Search Report and Written Opinion mailed Jan. 28, 2013, issued in related International Application No. PCT/US2012/048013, filed Jul. 24, 2012, 9 pages.

* cited by examiner

*Primary Examiner* — Steven Leff
(74) *Attorney, Agent, or Firm* — Christensen O'Connor Johnson Kindness PLLC

(57) ABSTRACT

Disclosed herein is an apparatus for treating food products, such as any species of meat (beef, pork or lamb) and ground beef, being transported in a fluid, such as carbonic acid liquid carbon dioxide, at a pressure sufficient to maintain the carbon dioxide as a liquid.

6 Claims, 2 Drawing Sheets

US 8,940,345 B1

ANTIMICROBIAL ULTRAVIOLET DEVICE

CROSS-REFERENCE TO RELATED APPLICATION

This application claims the benefit of U.S. Provisional Application No. 61/303,185, filed on Feb. 10, 2010, the disclosure of which is fully incorporated herein expressly by reference.

BACKGROUND

Published PCT Application Nos. WO 2006/060596, WO 2006/113543, and WO 2005/099482, by applicant, disclose methods for treating, processing, and separating food products, such as ground beef, into various components and/or the combination of various components into a single meat product having controlled amounts of fat and lean meat. The processing and handling of such food products involves the transporting of materials through pipes, fluorescent tubes, and conduits. A preferred material disclosed in such publications for transporting the food products is liquid carbon dioxide at an elevated pressure, which maintains the carbon dioxide as a liquid. Liquid carbon dioxide can have antimicrobial properties, particularly when combined with a corresponding quantity of water such that the two liquids, when maintained within a pressure vessel or series of interconnecting conduits and pressure vessels are arranged to allow the combining by mildly exothermic reaction of the two liquid compounds of $H_2O+CO_2$, which will yield→$H_2CO_3$ (carbonic acid). To supplement the antimicrobial effect of liquid carbon dioxide, methods and apparatus are continuously being sought to produce safe, sterilized food products, such as meat, and, in particular, cut up or ground meat.

SUMMARY

Disclosed herein is an apparatus for treating food products, such as meat and ground beef, being transported in a fluid, such as liquid carbon dioxide, at a pressure sufficient to maintain the carbon dioxide as a liquid, semi-liquid and/or dense fluid such as super critical phase carbon dioxide to maintain the carbon dioxide at a desired specific gravity, such as between about 70 lbs/cu. ft. to about 25 lbs/cu. ft., but in any case in a transparent and fluid phase condition. The apparatus includes a conduit that is transparent to a certain wavelength of energy, and an energy emitting element surrounding the circumference of the conduit. Solid food products can be fluidized and carried in suspension with the fluid as they are transferred through the conduit. The fluidized state of the solid food particles causes the particles to rotate and tumble in the fluid such that the surfaces of the particles are exposed to the energy. The energy is preferably ultraviolet C, and the fluid is preferably liquid carbon dioxide. Liquid carbon dioxide allows the energy to penetrate without much attenuation.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As disclosed in the aforementioned publications in the background section, food products, such as meat and ground beef, are transported in a fluid, particularly, liquid carbon dioxide at a pressure sufficient to maintain the carbon dioxide as a liquid. The apparatus disclosed herein can be incorporated into any line, tube, pipe, or conduit transporting such materials to cause the food products to be effectively sterilized without affecting the eating qualities of the food.

Figure 1:
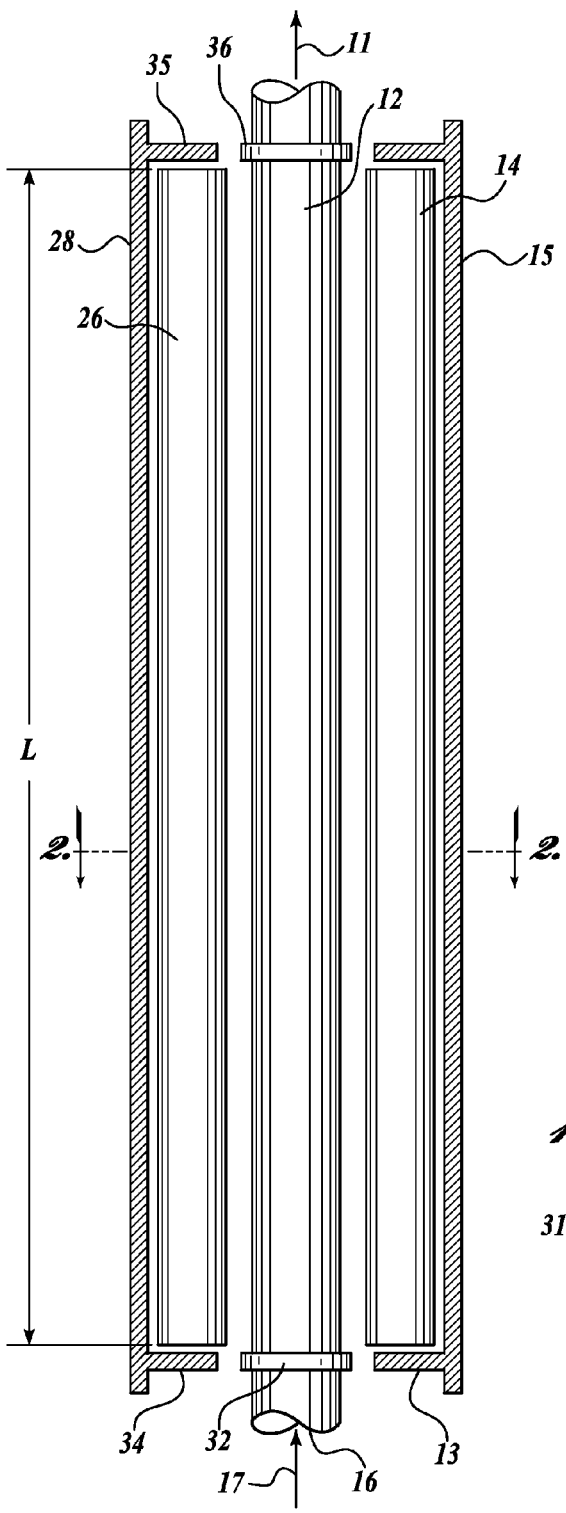
FIG. 1 is a length-wise cross-sectional illustration of an apparatus to treat food products.
Figure 2:
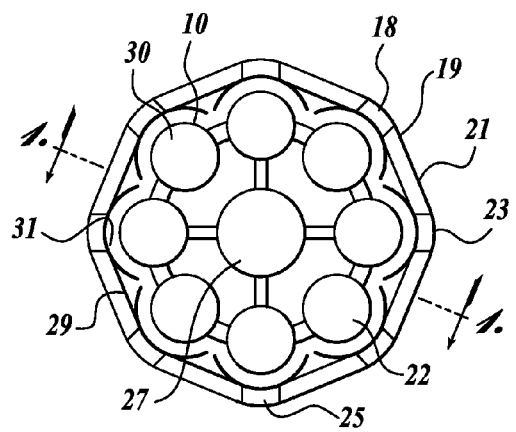
FIG. 2 is a cross-sectional illustration of the apparatus of FIG. 1.

Referring to FIGS. 1 and 2, the apparatus includes a tube 012 or conduit. A tube is only one implementation of a conduit. The tube 012 is transparent to certain wavelength energy, such as ultraviolet and, particularly, to ultraviolet C. However, other wavelength energy can be used as long as such different wavelength energy can penetrate the tube 012 without affecting the anti-bacteria, bactericidal effectiveness of the penetrating energy or alternatively, the effectiveness or capacity of the energy penetrated tube to remain capable of retaining the pressurized liquid retained by the tube and through which it is transferred. For example, it is known that ultraviolet light, including UVc, can render extruded, transparent uPVC tubing having gas barrier and high pressure rating conduit qualities, to become a translucent yellow coloration with brittle or friable consistency, which then, therefore, renders it useless for high pressure liquid retention. Alternative forms of energy can include electron beam, irradiation, microwave, X-ray, infrared, or the like. Ultraviolet C radiation is generally considered to be light energy having a wavelength from 200 to 290 nanometers. In one embodiment of the tube 012, the tube 012 is also transparent to visible light. Further, in one embodiment, the tube 012 can be made from polycarbonate or other such materials that can withstand a pressure of about 10 psig to about 3,000 psig, which is the pressure range at which carbon dioxide is a liquid from about (minus 60° F.) −60° F. to about (plus 87.9° F.) +87.9° F., but most preferably the fluid will be maintained at a temperature range of about 1° F. to 26° F. As mentioned before, the tube 012 can be incorporated into any line that carries any suitable food material. For example, the tube 012 can be connected at a proximal and distal end of a stainless steel tube 016. The tube 012 is held to the end of the stainless steel tube 016 via clamp 032 on one side and via clamp 036 on the opposite and distal side. In FIG. 1, the proximal side is considered the side on which clamp 032 is located. The distal side is considered the side on which clamp 036 is located. Arrow 017 is intended to indicate the direction of flow of material through the tube 012, whereas arrow 011 shows the direction of material exiting from the tube 012. Although FIG. 1 illustrates the apparatus as being vertically disposed, the apparatus does not need to be placed in the vertical position and may be placed in any other position relative to the ground. The apparatus includes one or more energy emitting elements, such as energy emitting elements 014 and 026. The energy emitting elements 014 and 026 are generally disposed parallel to the tube 012 and also extend generally the same length as the tube 012 or extend beyond and overlap the ends of the clear section of the transparent conduit, that is, the one or more energy emitting elements extend from the proximal side of the tube 012 to the distal side of the tube 012. A space or gap may be provided between the side of the energy emitting elements 014 and 026 and the side of the tube 012, although this is not a requirement.

As best seen in FIG. 2, in one embodiment, more than one energy emitting element or member may be provided. Generally, the tube 012 may be centrally located and enclosed within an arrangement, whereby energy emitting fluorescent tubes, such as 014 and 026, are located in an array or circular arrangement around the central tube 012 and disposed at an equal distance from the tube 012, so that the energy emitting elements may cover the circumference of the tube 012. The energy emitting elements may be evenly spaced around the circumference of the tube 012. However, a single energy emitting element may be manufactured as a unitary cylinder that also extends approximately the whole length of the tube 012. In the case where multiple energy emitting elements are used, each energy emitting element may take the form of a tube. In this case, each individual tube is paired with a reflector, such as reflector 031. Reflector 031 extends the length of the energy emitting element with which it is paired. Reflector 031 is concavely shaped to focus or direct reflected energy to the tube 012. Reflector 031 is positioned so as to reflect all energy beams or rays inward toward the center of the tube 012 and thereby concentrate and/or direct the energy produced by the energy emitting element towards the center of tube 012, which, in the illustrated embodiment, is disposed at the center of the assembly. A suitable frame, such as 021, may be used to hold the individual energy emitting elements in the desired spatial relationship with respect to the central tube 012 and with respect to each other. Additionally, an exterior frame 021 may be used to hold each individual reflector 031 that is paired with each individual energy emitting element in the desired spatial relationship with respect to the energy emitting element and to the central tube 012. For example, as seen in FIG. 1, each individual energy emitting element, such as 026, is held within the frame 015 with an upper and a lower bracket, such as bracket 035 and 034, respectively. Each reflector that is paired with an energy emitting element is attached to the inside of the frame 015. However, any other suitable frame made to hold energy emitting elements and reflectors may be used. As mentioned before, preferably, the energy emitting elements 014 and 026 produce ultraviolet C radiation. Means to produce ultraviolet C (UVc) radiation are known in the art; therefore, a detailed description is omitted for brevity. Ultraviolet C radiation passes through the walls of the tube 012 where it can strike the food product passing within the inside of the tube 012. One embodiment of the tube 012 as shown in FIGS. 1 and 2 is of round cross-sectional profile and a round profile is convenient since tube extruding dies are typically built so as to produce round tubing, however, any suitable profile can be incorporated and most preferably any profile that can most effectively expose the outer surfaces of all food particles to the UVc light. The lethal or bactericidal effectiveness of the UVc light is enhanced when the distance between the UVc light source and the external surfaces of each food particle, carried by the enclosed fluid, is minimized, and this can be achieved by reducing the depth of the transparent conduit or thickness across the conduit while still allowing the free flow of the food particle carrying fluid with the UVc emitters arranged in closest proximity to the food particles.

Figure 3:
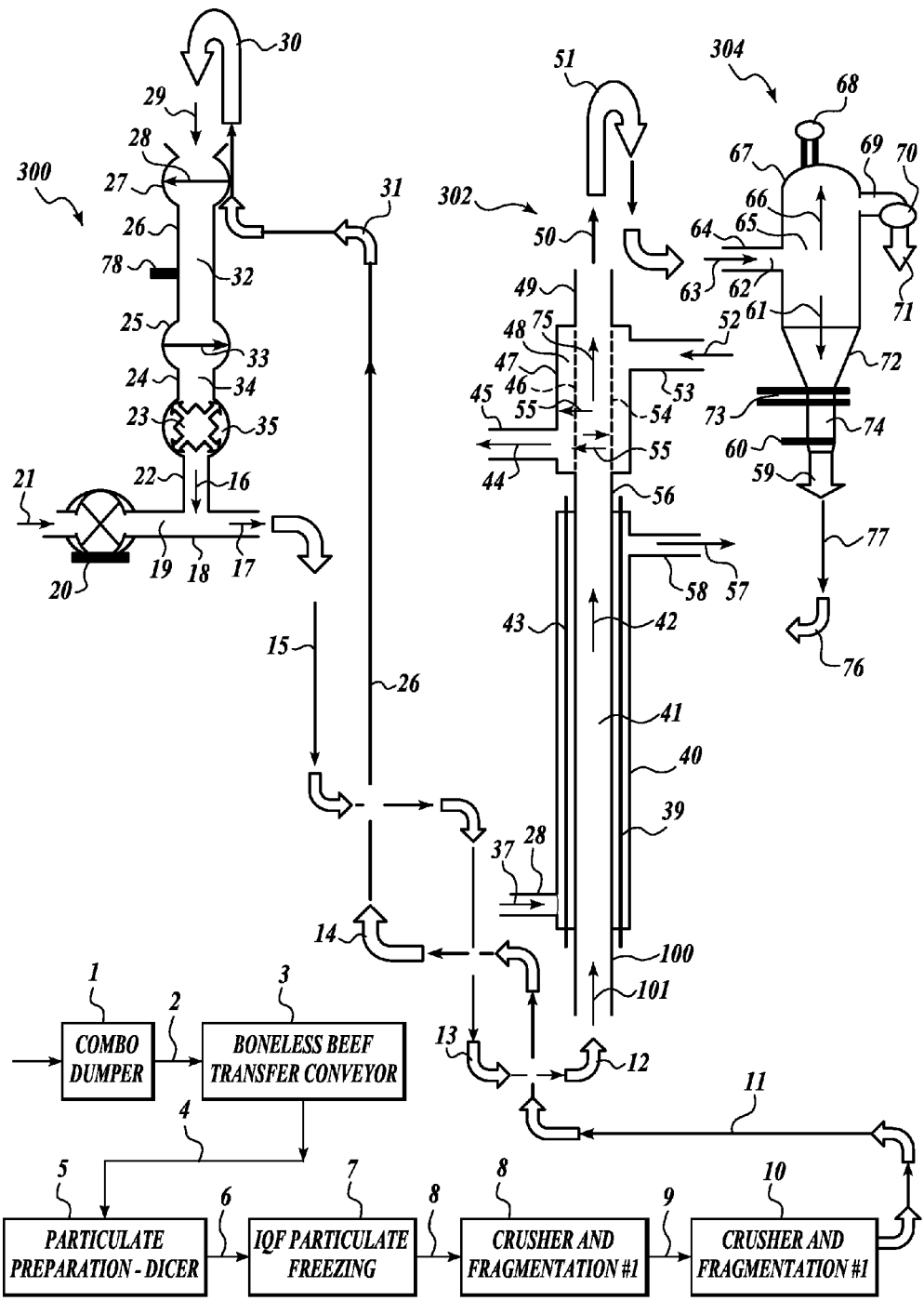
FIG. 3 is a partially diagrammatic view and length-wise cross-sectional illustration, through a vertical plain of equipment designed for the electrophoresis of organic matter (pathogens such as *salmonella, E. Coli.* 0157:H7 and other harmful DNA containing bacteria), which may be present on the surfaces of meat (food) and in particular beef used to manufacture fresh ground beef, by exposure to UV light having a range of wavelength between 150 nm and 300 nm.

The method by which the food particles are prepared, prior to treatment by suspension in fluid then transferred adjacent to the UVc light source, is important; grinding will not provide beef (or meat) particulates having clean cut surfaces and causes emulsification of a significant proportion of the beef stream passed through the grinder. Pathogens can, in this way, be protected from the lethal effects of UVc by being encapsulated in emulsified beef when the beef is ground prior to treatment. The preferred method of particulate production is to dice boneless beef in slicing and dicing equipment such as manufactured by Carruthers of Warrenton, Oreg. Following dicing by slicing with sharp knives to provide 1" or 2" sized "cubes" of beef in a continuous stream, the diced beef or particulates is frozen by reducing the temperature of the frozen particulates to not more than 29° F. and preferably not less than 0° F. but most preferably about 15° F. to about 24° F. The frozen particulates are then crushed by applying a force across the frozen dices at a pressure of greater than 25 psi, so as to cause the fat component of each frozen beef cube to fracture and become separated from the lean component of the diced beef particles. Following said crushing, the frozen stream of beef particulates are blended with a selected fluid such as water or carbonic acid. The ratio of frozen beef (meat) particulates (fp) to fluid (f) [i.e. fp:f] should be between 1:1 and 1:10 but most preferably at about 1:5; however, most importantly, the ratio of frozen beef to fluid will be such that when the suspension of beef particulates is exposed to UVc in a conduit there is sufficient space between particles to allow UVC direct line of sight contact over the entire surfaces of the beef particles.

The temperature of the fluid carbonic acid or other fluid (suspension or buoyancy medium) should be not less than about 40° F. and not greater than about 60° F., but most preferably at about 50° F., before being mixed with the beef particulates.

When the beef particulates and fluid are mixed together, whether enclosed within separation conduits (tubes), an enclosed vessel, a centrifuge, or hydro-cyclone, the equilibrated temperature of the fluid should not be less than about 31° F. to about 40° F., but most preferably at about 32° F. to 34° F.

When the fluid is first mixed with the frozen lean beef and beef fat particulates, all of the particulates will float, suspended at the uppermost space available in the fluid and just below a surface of the fluid or suspended within the fluid; as the temperature of the fluid and particulates equilibrates, which involves the initial lower temperature of the beef particulates increasing, corresponding with the decreasing temperature of the fluid, the buoyancy of the lean particulates will start to "fail" until the lean particulates sink to the base of the fluid leaving the beef fat particulates floating at the fluid surface or uppermost available space in the fluid.

Bone chips that may be present with the beef particulates will sink when all mixed together with the fluid, thereby providing a very convenient means of separating bone chips, which will most preferably be arranged to occur immediately after blending the beef particulates with the fluid and before temperature equilibration of the particulates or more importantly when the lean beef temperature has increased so as to thaw the lean/water content of the lean beef upon which shrinkage of the lean beef will occur causing it to sink in the fluid. The fat particulates, frozen or not, will remain floating at the fluid surface. By lowering the fluid temperature relative to the temperature of the beef particulates, complete thawing and temperature equilibration will be delayed and, accordingly, the lean particulates will remain suspended for a longer period and this can assist with UVc pathogen deactivation as described below.

The frozen beef particulates suspended in the anti-microbial fluid (at a suitable ratio of fluid:particulates in the range of 1:5 to 1:10) can be treated by exposure to UVc light, which is lethal to pathogens when the exposure is sufficient. The suspension of frozen beef particulates in sufficient anti-microbial fluid (or water) can be transferred at a steady rate of transfer through an enclosed/sealed internally polished (preferably stainless steel) tube within which an elongated, tubular profiled, UVc light source is mounted, in parallel with the enclosing SS tube. As the temperature of the suspension steadily equilibrates the outer surface of the beef particles thaw, if pathogens are present, the single celled organisms will be at the surface of the beef particulates or suspended in the fluid but in any event at locations readily accessible to the direct "line of sight", UVc light source given that the particulates revolve while suspended. UVc is lethal to such pathogens as *E. Coli* 0157:H7 and *Salmonellas* and such pathogen contamination can be deactivated by adequate exposure to UVc. The particulates suspended in the fluid revolve randomly as the suspension is transferred through the UVc apparatus. Pathogens are quickly deactivated when exposed to the UVC (or UVc) light source particularly when the UVC wavelength has been selected from either 100 nanometers to 300 nanometers or, more particularly, in the immediate range of the effective germicidal wavelength of 285 nanometers; or 200 nanometers to 300 nanometers wavelength or in the immediate germicidal wavelength of 185 nanometers.

The following indicates the wavelength in nanometers (nm) for UVA, UVB, and UVC:

UVA—420 nm-320 nm;

UVB—320 nm to 285 nm;

UVC—285 nm to 100 nm.

Most preferably the UVC wavelength of the UVC light source to which the above referenced beef particulates will be exposed will be in the ranges of 250 nm to 100 nm; or 150 nm to 100 nm.

A preferred fluid such as clean, distilled or de-ionized, temperature controlled water, or a solution of inorganic acid (Hydrochloric and/or Hypochlorous acids, or Sulfuric acid) or carbonic acid, or organic acids such as ascorbic, acetic or lactic acids or others or alternatively a salt solution comprising water and sodium chlorite to increase density and to provide an anti-microbial effect when the sodium chlorite solution laden beef particulates are immersed in low pH carbonic acid or ascorbic acid, or water and sodium chloride (to increase density) for conveying the food product within tube 012 is preferably also transparent to the wavelength of the energy produced by the energy emitting elements 014 and 026. Additionally, the food particle carrying fluid should remain clear and distinctly separated from the food, without absorbing any food component such as blood or any other separated food item such as, for example, fat particles or alternatively what is commonly known in the meat processing industry as "bone dust" that could otherwise reduce the transparency of the food particle carrying fluid by becoming "milky". A preferred fluid is nitrogen or carbon dioxide at a pressure sufficient to maintain the carbon dioxide as a liquid, semi-liquid, and/or as a dense fluid, such as super critical phase carbon dioxide, to maintain the carbon dioxide at a desired specific gravity, such as between about 70 lbs/cu. ft. to about 25 lbs/cu. ft. but in a transparent and fluid phase condition. In one embodiment, the carbon dioxide can be at a pressure of about 300 psig to about 450 psig, which is the pressure range at which carbon dioxide is a liquid from about OT to about 24° F. Additionally, the liquid carbon dioxide may be passed over frozen water (ice) to produce carbonic acid. The food particles or pieces are preferably not densely packed within the tube 012 as they pass within the tube 012. More preferably, the food particles or pieces are fluidized within the tube 012, so that the food pieces may tumble and rotate randomly so that all surfaces, and especially the un-cut and "older" surfaces of the food particles, are exposed to the energy being produced by the energy emitting elements 014 and 026 or being reflected from reflectors. Preferably, the fluid is transparent to and allows the passage of the particular wavelength energy without much attenuation. Accordingly, direct energy produced by the energy emitting elements 014 and 026 is allowed to penetrate the walls of the transparent tube 012 and directly strike the surfaces of the food being carried by the tube 012. Additionally, reflected energy from the reflectors bouncing off the reflector 031 also passes the walls of the transparent tube 012 to strike the surfaces of the food. Preferably, the flow within the transparent tube 012 may be turbulent so as to create a mixing motion of the food particles, so that all surfaces of the particles are eventually exposed to the energy being produced by energy emitting elements 015 and 026 before exiting from the distal end of the tube 012. The tube 012 is made of a length that is adequate so that it can be assured that all food particles within the tube 012 are eventually exposed to the energy. If it is determined by empirical testing that the pathogen or bacteria population of the food product is not reduced to an undetectable level, the length of transparent conduit sections arranged with bacteria killing ultraviolet C light tubes can be increased until it is determined that no viable pathogenic bacteria remain in the processed food product.

Referring now to FIG. 3 a preferred embodiment is illustrated in a vertically disposed cross sectional view of apparatus designed to facilitate exposure to the electrophoresis effects of ultra violet light having a wave length of about 185 nanometers in one instance and about 285 nanometers in a second instance.

The electrophoresis effects of short wavelength light (UVC) has been used to cause damage to the DNA of bacteria, thereby rendering the bacteria non-viable. A most effective bactericidal UVC light wavelength has been demonstrated to be in the range of 187 nanometers, however, the conditions required to enable this UV wavelength to contact the bacteria carried on the food surfaces are challenging in a food mass production apparatus. It is a purpose of this invention to provide a method and apparatus wherein the short wavelength bactericidal benefits of UV light can be applied in mass processing of, in particular, beef particulates. The space between the UVC light source and the bacteria containing organic matter most preferably comprises a vacuum or dry nitrogen gas filled space. If air and/or water is present and the organic matter is in submerged in water, the shorter wavelength UVC light is substantially disrupted, and it has been found that UVC of about 285 nanometers wavelength is more suitable. Clearly, water cannot be in direct contact with the UV light generating source, for example, low pressure, high temperature mercury vapor, nor indeed can the organic matter itself be in contact with the UV light generating source given the high temperature conditions required to generate UV light. It is therefore necessary to provide barriers that are transparent to the selected UV light wavelength, between the UV source and the treated food matter. Materials that have been used to provide UV light transparent barriers include certain gases such as nitrogen, water, PMMA (Poly-Methyl-Meth-Acrylate), or Acrylic and quartz glass; however, these materials generally limit the useful us of UV light to wavelengths at about 285 nm. A most suitable material is synthetic UV grade quartz glass or UV grade fused silica which allows 80% penetration of UVC 185 nm wavelength.

FIG. 3 is a schematic of apparatus to separate fat from lean. Applicant's U.S. Patent Application, titled "METHOD FOR SEPARATING BONE FRAGMENTS AND TALLOW FROM A SINGLE INGREDIENT STREAM OF BEEF BY CONTROLLING THE FROZEN CONDITION OF THE BEEF AND IMMERSING IN CARBONIC ACID AT ELEVATED PRESSURES," filed on Feb. 9, 2011, and assigned application Ser. No. 13/024,178, is incorporated herein expressly by reference. This prior application discloses similar apparatus as shown in FIG. 3. As illustrated in FIG. 3, a combo dumper 81 transfers boneless beef (either 65's, 50's or 73's) via a connection represented by arrow 82 to a boneless beef transfer conveyor 83.

Conveyor 83 feeds particulate preparation, dicing apparatus 1, via connection 84 in the direction shown by arrows.

A stream of diced beef is transferred from dicing equipment 1 to a cryogenic IQF (Independently Quick Frozen) $CO_2$ conveyor freezer 3 via connection 2. The diced particulates are size reduced to not more than about 2" cubes prior to freezing and then temperature reduced a temperature between 0° F. and 29° F.

The stream of frozen diced beef cubes or beef pieces is then transferred via connection 4 to a primary crusher 5 that is arranged to fragment the diced beef into smaller particles of fat, which, under such treatment and when frozen to a suitable temperature between 0° F. and 29° F., will "crumble" while the lean component of the frozen beef is generally unaffected by the crushing process.

A second crusher 7 completes a process that reduces the treated tallow to crumbs that, in large part, separate from the lean beef component which is again generally unaffected by the crushing process. A vacuum source is applied via an enclosed conduit causing a stream of spent/exhaust carbon dioxide gas from the IQF tunnel to carry the stream of crushed beef particulates into holding vessel 59. Carbon dioxide gas is fed into the second crusher 10 to displace air and provide the gas by which a vacuum source enables transfer of the frozen beef particulates through an enclosed conduit represented by arrows 11, 14, 26, 31, 30 and 29 to the inlet valve 27. In this way, frozen beef particulates are transferred into enclosed space 52 via valve 27. Valve 27 comprises a member 28, which can be rotated to provide either a closed or an open condition and as shown in FIG. 3, valve 27 with rotatable member 28 is shown in a closed condition. When open the stream of beef particulates transfer into space 32 and when substantially full, member 28 rotates within valve 27 to provide a closed condition and sealing the contents of vessel 26 between valve 27 and 25. Carbon dioxide gas is provided via valved port 78 to pressurize the free space within vessel 26 in space 32 up to a pressure equal to the pressure within conduit 18 space 19. When the pressure of CO2 gas in space 32 is equal to the pressure in space 19, valve 25 member 33 rotates and frozen beef particulates fall into space 34 of transfer conduit 24, which communicates directly with rotary valve 35 with rotating member 23 located therein. Rotating member 23 rotates at a predetermined rate of greater than 10 rpm and less than 100 rpm, transferring a controlled flow of frozen beef particulates in the direction shown by arrow 16 via conduit 22. Conduit 22 communicates directly with conduit 18 at a "T intersection." Positive displacement pump 20 pumps fluid, which is most preferably distilled water or other suitable organic acids or carbonic acid, in the direction shown by arrows 21 and 17.

Temperature controlled, distilled, oxygen free and/or de-ionized, oxygen free water is most preferably used as the fluid medium, provided in the direction shown by arrow 21 via positive displacement pump 20, in which frozen beef particulates are carried at a ratio of 1 part frozen beef to 5 parts water or greater; alternatively, a fluid comprising pressurized water with dissolved carbon dioxide can be used in which the frozen beef is suspended.

Conduit 18 as shown is representative of an enclosed loop wherein a suitable pressure is maintained. Beef particulates therefore combine after transfer through conduit section 22 with the fluid transferred through space 19 of conduit 18 and are carried therewith in the direction shown by arrow 17, 15, 13, and 12, and into conduit 56 of UV pathogen deactivation apparatus 40. Suspended and frozen beef particulates are carried through conduit 56 in the direction shown by arrow 42 so as to be exposed to UVC emanating from UVC generators such as 39 and 43. Conduit enclosing space 41 comprises a quartz glass tube manufactured most preferably from fused silica having a thickness of about 10 mm so as to allow UVC of wave length 160 nm to pass through and contact the surfaces of frozen beef particulates being carried there through. It should be noted that the temperature of the fluid water transferred in the direction shown by arrow 21 is maintained at about 40 degrees F. or less, such that, when frozen particulates are in contact, a film of ice can form over the beef particulates in one instance having a thickness that does not inhibit the transfer of UV light there through or alternatively the temperature of the fluid in contact with the beef particulates causes a thawing only at the surface of the beef particulates. In this way, UV light of wave length 160 nm or in another instance 285 nm generated by UV sources 39 and 43 can penetrate the fused silica walls of conduit 100 of the chilled water in which the beef particulates are immersed and to contact directly any pathogens present at the surface of the beef particulates. It should be noted that the transfer of beef particulates in this way through conduit 100 in the direction shown by arrow 101 causes a continuous revolving rotating movement of the beef particulates so as to ensure all surfaces are exposed to the UV source. In a preferred embodiment multiple UV sources arranged around the conduit 100 in close proximity to the outer surface of the conduit are immersed in nitrogen gas transferred via conduit 28 in the direction shown by arrow 37 wherein each alternate UV source is firstly a UV generating source of 160 nm wavelength when the alternate UV source generate UV light having a wave length of about 285 nm. When exposed in this way to UVC the DNA of the bacteria or viruses present is rearranged such that reproduction is not possible and in fact bacteria will die when reproduction is attempted. The enclosure 40 comprises a cylindrical tube of highly polished stainless steel on the inner surface and the space around the contents within enclosed cylinder 40 are immersed in nitrogen gas most preferably transferred there through and out of via conduit 58 in the direction shown by arrow 57 in sufficient volume to cool and maintain a suitable temperature.

Conduit 100 is connected directly to assembly 47 comprising an outer cylindrical member of stainless steel with inlet conduit 53 and outlet conduit 45 attached directly thereto. The enclosed member 47 is sealed at each end around conduit 56 and 49. However, conduit section 46 has perforations 54 to allow the exchange of water with carbonic acid pressurized at a selected value. Particulates are carried in a stream continuing in the direction shown by arrow 75 into conduit 46 however approximately 80%-90% of the fluid water is diverted in the direction shown by arrows 55 and arrow 44 through conduit 45. This is achieved by the ingress of the corresponding volume of carbonic acid via conduit 53 in the direction shown by arrow 52, and, in this way, the fluid carrying beef particulates is exchanged for fluid entering conduit 53, which displaces the water via conduit 45. The water is then treated and recycled. A stream of beef particulates now carried in fluid carbonic acid in the direction shown by arrow 50 and 51 and into conduit 64 in the direction shown by arrow 63 and after transfer through space 62 into space 65 of separation vessel 67. Cross sectional view 304 of separation apparatus is shown in diagrammatic form but generally disposed in a vertical disposition wherein a cylindrical section connects to an end cap at the upper end and a conical shaped member 72 at the lower end terminating at a gate valve 73. A vessel with space 74 is located between gate valve 73 and gate valve 60. An outlet via enclosed conduit space 69 with flow regulator 70 is provided at the upper end of the enclosed separation apparatus and an arrow 71 indicates the direction in which tallow is transferred in an enclosed conduit. The volume of space 65 is sufficient to allow the flotation of tallow in the direction shown by arrow 66 and settling of lean particulates by sedimentation in the direction shown by arrow 61. In this way a continuous flow of carbonic acid carrying beef particulates, formerly frozen and having now thawed, such that the water contained in all particulates has contracted to provide lean particulates having a density greater than about 62.4 lbs/cu/ft will sink in the direction shown by arrow 61 and through the open gate valve 73 and into space 74. When space 74 is filled gate valve 73 can be closed so as to isolate space 74 allowing transfer of a second stream of lean beef in the direction shown arrows 59, 77, and 76. The flow of lean beef shown by arrow 76 is transferred for further processing according to processes provided in other patent disclosures.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for treating food, comprising:
   providing solid food in a fluid to create a fluidized suspension comprising solid food;
   transferring the fluidized suspension through a conduit, wherein the conduit is transparent to a wavelength of energy, wherein the energy is harmful to bacteria, wherein the solid food is carried in the fluidized suspension within the conduit;
   directing energy from an exterior location into the conduit, wherein the energy is harmful to bacteria and the energy passes through at least a wall of the conduit and fluid to strike the food; and
   producing turbulence within the conduit and causing rotation and tumbling of the food within the fluidized suspension as the fluidized suspension passes within the conduit and is irradiated with the energy passing through the conduit wall.

2. The method of claim 1, wherein the fluid is liquid carbon dioxide.

3. The method of claim 1, wherein some of the energy is reflected before passing through the conduit.

4. The method of claim 1, wherein the food is meat or ground beef.

5. The method of claim 1, further comprising arranging energy emitting elements in a circular pattern lengthwise with respect to the conduit so as to encircle the circumference of the conduit.

6. The method of claim 1, further comprising arranging pairs of energy emitting elements with reflectors in a circular pattern lengthwise with respect to the conduit to encircle the circumference of the conduit.

\* \* \* \* \*